United States Patent
Van Den Dungen et al.

(10) Patent No.: US 10,701,512 B2
(45) Date of Patent: Jun. 30, 2020

(54) GEO-FENCING BASED ON MULTIPLE SIGNALS AND CONFIGURATION

(71) Applicant: KONINKLIJKE PHILIPS N.V., Eindhoven (NL)

(72) Inventors: Wilhelmus Andreas Marinus Arnoldus Maria Van Den Dungen, Boxtel (NL); Stephen Ledingham, Waltham, MA (US); Tomas Russ, Chelmsford, MA (US); Wilhelmus Josephus Box, Eksel (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 29 days.

(21) Appl. No.: 16/306,054

(22) PCT Filed: May 30, 2017

(86) PCT No.: PCT/EP2017/063041
§ 371 (c)(1),
(2) Date: Nov. 30, 2018

(87) PCT Pub. No.: WO2017/207572
PCT Pub. Date: Dec. 7, 2017

(65) Prior Publication Data
US 2019/0215648 A1    Jul. 11, 2019

Related U.S. Application Data

(60) Provisional application No. 62/343,221, filed on May 31, 2016.

(51) Int. Cl.
*H04W 4/021*    (2018.01)
*G01S 5/00*     (2006.01)
(Continued)

(52) U.S. Cl.
CPC .............. *H04W 4/021* (2013.01); *G01S 5/00* (2013.01); *G01S 5/02* (2013.01); *G01S 5/0284* (2013.01);
(Continued)

(58) Field of Classification Search
CPC ...................................................... H04W 4/021
(Continued)

(56) References Cited

U.S. PATENT DOCUMENTS

| 5,661,460 A | 8/1997 | Sallen et al. |
| 7,577,444 B2 | 8/2009 | Bird et al. |

(Continued)

FOREIGN PATENT DOCUMENTS

| KR | 2011035989 A | 4/2011 |
| WO | 2014128627 A1 | 8/2014 |

(Continued)

OTHER PUBLICATIONS

Oliveira et al: "Fusing Time-Of-Flight and Received Signal Strength for Adaptive Radio-Frequency Ranging"; IEEE, 2013, 6 Page Document.

*Primary Examiner* — Joel Ajayi

(57) ABSTRACT

A geo-fencing system (102) includes a base device (104) configured to create a virtual fence (108) around the base devise that bounds a safe zone (110). The geo-fencing system further includes a wearable device (106) initially located within the safe zone. The geo-fencing system further includes a processor configured to execute a dynamic adaptive control algorithm that computes at least one operating parameter for at least one of the base device and the wearable device based on a dynamic and adaptive combination of different signals indicative of distance measurements between the wearable device and the base device computed by the at least one of the base device and the (Continued)

wearable device. The processor conveys the at least one operating parameter to the at least one of the base device and the wearable device, which employs the at least one operating parameter for operation and determination of subsequent distance measurements.

12 Claims, 4 Drawing Sheets

(51) Int. Cl.
| | |
|---|---|
| G01S 11/02 | (2010.01) |
| G01S 19/17 | (2010.01) |
| G01S 5/02 | (2010.01) |
| H04B 17/318 | (2015.01) |
| H04W 4/02 | (2018.01) |
| H04W 24/10 | (2009.01) |

(52) U.S. Cl.
CPC ............... *G01S 11/02* (2013.01); *G01S 19/17* (2013.01); *H04B 17/318* (2015.01); *H04W 4/023* (2013.01); *H04W 24/10* (2013.01)

(58) Field of Classification Search
USPC ...................................................... 455/456.1
See application file for complete search history.

(56) References Cited

U.S. PATENT DOCUMENTS

| | | |
|---|---|---|
| 8,130,116 B1 | 3/2012 | Daigle |
| 8,878,670 B2 | 11/2014 | Rosen et al. |
| 2009/0289844 A1 | 11/2009 | Palsgrove et al. |
| 2010/0240396 A1 | 9/2010 | Zhang et al. |
| 2014/0092844 A1 | 4/2014 | Xiao et al. |
| 2015/0065161 A1 | 3/2015 | Ganesh et al. |
| 2016/0131755 A1 | 5/2016 | Wijbrans |

FOREIGN PATENT DOCUMENTS

| | | |
|---|---|---|
| WO | 2014195161 A1 | 12/2014 |
| WO | 2015196362 A1 | 12/2015 |

GEO-FENCING BASED ON MULTIPLE SIGNALS AND CONFIGURATION

CROSS-REFERENCE TO PRIOR APPLICATIONS

This application is the U.S. National Phase application under 35 U.S.C. § 371 of International Application No. PCT/EP2017/063041, filed on May 30, 2017, which claims the benefit of U.S. Provisional Patent Application No. 62/343,221, filed on May 31, 2016. These applications are hereby incorporated by reference in their entirety herein.

FIELD OF THE INVENTION

The following generally relates to geo-fencing and more particularly to geo-fencing based on multiple signals and geo-fencing configuration.

BACKGROUND OF THE INVENTION

A geo-fence is a virtual fence bounding a real-world geographic region. This virtual fence can be used as part of a geo-fencing system to detect when a person within the bounded area leaves the bounded area. An example application is monitoring whether a person with dementia (e.g., from Alzheimer's disease) leaves a "safe zone" (e.g., personal house, group home, etc.) defined by the virtual fence. In response to detecting the person has left the bounded area, the geo-fencing system triggers transmission of a signal (e.g., email, text message, smartphone notification, etc.) which indicates the person has left the bounded area.

The "safe zone" can be set up by manually measuring a distance from the base device to a desired location, for one or more desired locations. The greatest distance of the distances for these one or more desired locations is then manually entered into the "safe zone" running on the base device, which creates a circular "safe zone" around the base device with a radius equal to the greatest distance. Unfortunately, not all desired locations are located linearly from the based device, making certain measurements difficult and error prone. Furthermore, a distance measurement made by the base device for a particular location may be different from the manually measured distance for that location, e.g., due to device calibration, signal strength, etc.

A geo-fence based on Received Signal Strength Indicator (RSSI) or Time of Flight (ToF) (or Sine Phase based) can be monitored using a base device located at a center of the geo-fence and a portable device worn or carried by the person being monitored. The distance between the worn device and the base device is measured and compared to a distance between the base device and a perimeter of the virtual fence. RSSI and ToF based systems are based on a self-generated signal and thus are not dependent on coverage of other systems (e.g. GPS, cellular, etc.), and their power dissipation is relatively low making them well-suited for devices that require a battery for the power supply.

Unfortunately, RSSI signal strength is dependent on the structures around it. For example, the strength through a window or door will be different from the strength through a wall, and a metal object (e.g. a car) in the direct neighborhood will also influence the signal strength. As a consequence, using RSSI may result in a non-uniform, conditionally dependent, and/or unreliable distance measurement. ToF is less dependent on these parameters. However, when a person is standing in between the two devices ToF measurement errors can occur because the signal, e.g., via reflection, is stronger than the through the human body. This is also the case of no direct sight where a wall reflection can give measurement errors.

In view of at least the above, there is an unresolved need for another approach for geo-fencing.

SUMMARY OF THE INVENTION

Aspects of the present application address the above-referenced matters and others.

According to one aspect, a geo-fencing system includes a base device configured to create a virtual fence around the base device that bounds a safe zone. The geo-fencing system further includes a wearable device initially located within the safe zone. The geo-fencing system further includes a processor configured to execute a dynamic adaptive control algorithm that computes at least one operating parameter for at least one of the base devices and the wearable device based on a dynamic and adaptive combination of different signals indicative of distance measurements between the wearable device and the base device computed by the at least one of the base devices and the wearable device. The processor conveys the at least one operating parameter to the at least one of the base devices and the wearable device, which employs the at least one operating parameter for operation and determination of subsequent distance measurements.

In another aspect, a method for establishing a geo-fence safe zone includes the following: placing a wearable device and a portable wireless device at a predetermined distance from a base device, activating software of the portable wireless device to measure a first distance between the portable wireless device and the base device, moving the wearable device and the portable wireless device to at least one different distance from the base device, measuring, with the activating software, the at least one different distance between the portable wireless device and the base device, determining a largest distance of the measured distances, adding a predetermined margin to the largest distance, creating a geo-fence with a radius equal to the largest distance with the added margin, registering the geo-fence with the base and wearable devices, securing the wearable device to a subject located in the safe zone, and activating the base device and the wearable device to monitor a location of the subject.

In another aspect, a method includes reading in multiple signals indicative of distance measurements from electronics of at least one of a base device and a wearable device as a function of time. The method further includes dynamically and adaptively combining the distance measurements at different frequencies and power settings using historic data and physical limitations. The method further includes determining device settings for at least one of the base devices and the wearable device based on the combination of distance measurements.

Still further aspects of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
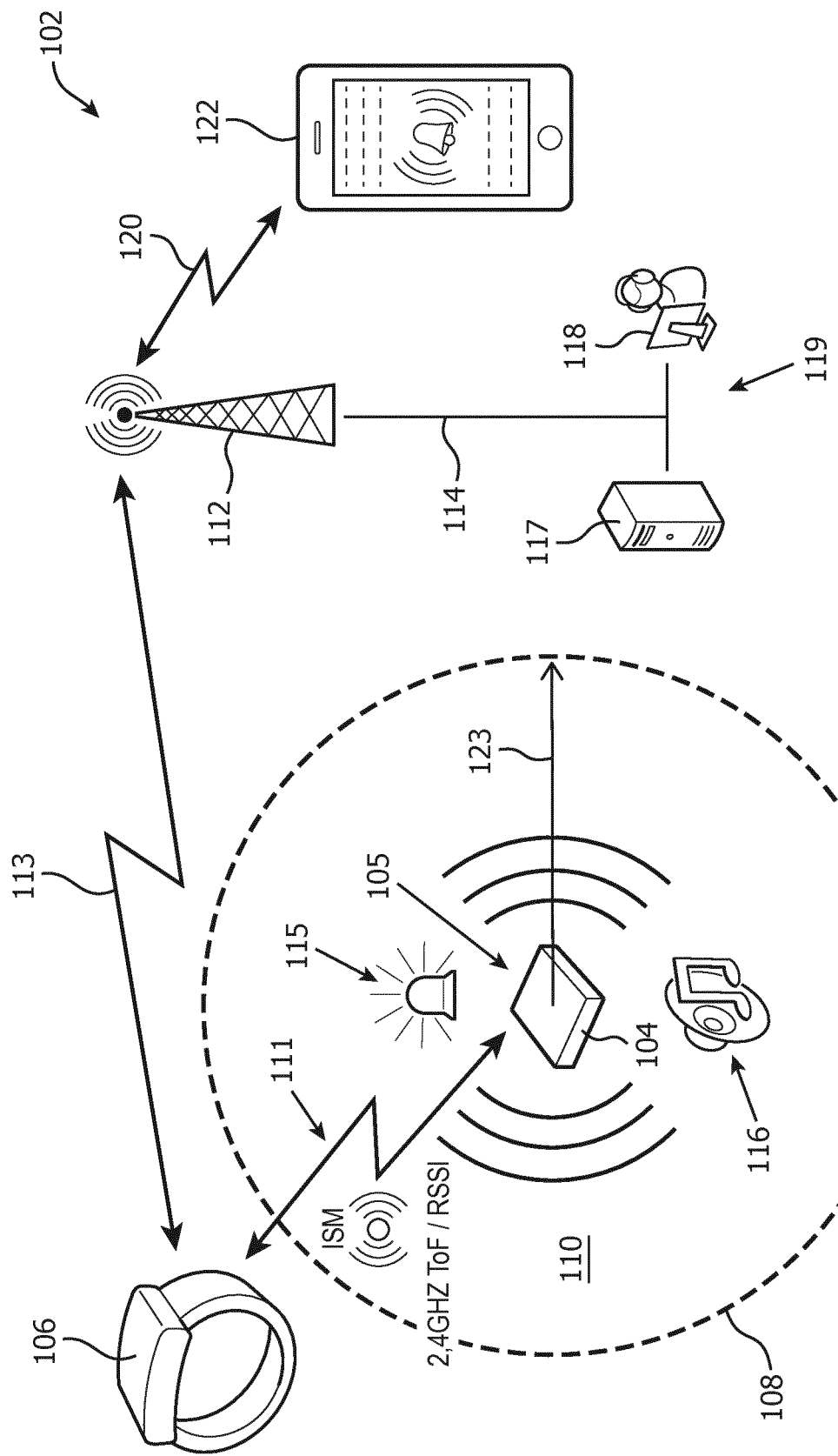
FIG. 1 schematically illustrates an example geo-fencing system.

FIG. 1 schematically illustrates a geo-fencing system 102. Applications of the geo-fencing system 102 include but are not limited to a security system, a child guarding/protection system, a pet guarding system, and a person with dementia monitoring system.

The illustrated geo-fencing system 102 includes a base device 104, a wearable device 106, and a virtual fence 108 (which includes a safety margin of zero to a predetermined distance of interest) bounding a "safe zone" 110. In the illustrated embodiment, the base device 104 is at a center region 105 of the virtual fence 108, which is circular in shape with a radius 123 in the illustrated example. The wearable device 106 is worn or carried by a subject being monitored.

The devices 104 and 106 are configured to wirelessly communicate via a wireless communication channel 111. Hardware and/or software executing on the devices 104 and 106 measures a distance between the devices 104 and 106 based on a characteristic of a signal of the communication. The distance is determined by at least one of the devices 104 and 106 based on different distance measurement signals, such as RSSI, ToF, Sine Phase, Wi-Fi, GPS, etc.

At least one of the devices 104 and/or 106 computes a dynamic and adaptive combination of the distance measurements, which is used to determine an operating parameter of at least one of the devices 104 and/or 106. The operating parameter effects subsequent distance measurements by the at least one of the devices 104 and/or 106. The following are non-limiting examples of different combinations of such distance measurements.

In one instance, a fixed combination of the signals described herein and/or other information is used. In another embodiment, an invariant and simple dynamic combination of the signals described herein and/or other information is used. In yet another embodiment, a dynamic combination in time is used. In still another embodiment, a completely adaptive combination is used. In yet again another embodiment, a self-learning (e.g., neural network type) algorithm is used. Non-limiting examples are described below in greater detail.

In one instance, the dynamic combination is dependent on the actual situation like environmental construction, position within the virtual fence 108, movements of the wearable device 106, blocking and unblocking of the radio signal by human body or other materials, etc. This combination of signals is dynamic at least since it is adapted at a given frequency (e.g., continuously, periodically, on-demand, etc.) based on the situation, e.g., to have a highest accuracy of distance measurement.

The wearable device 106 is configured to communicate with a cell tower 112 via a cellular channel 113. The cell tower 112 is configured to communicate, via a cable 114 (and/or wirelessly), with a server 117, which includes a monitor 118 and an input device such as a keyboard, a mouse, and/or the like, at a dispatch center 119. The cell tower 112 is configured to communicate, via a cellular channel 120, with a hand-held portable wireless device such as a smartphone 122, which can be carried by a guardian of the subject.

The portable device 122 includes a software application for configuring the "safe zone" 110. As described in greater detail below, with this software it is not necessary to know the radius 123 in advance. As a result, the process of creating the "safe zone" 110, relative to a configuration without the software application, is simplified. Furthermore, the radius 123 is automatically calibrated with distance measurements made by the portable device 122 and/or the base device 104.

In operation, the devices 104 and/or 106 compare the measured distances with the radius 123 of the virtual fence 108. Where the measured distance is less than or equal to the radius 123, the devices 104 and/or 106 determine the subject is in the "safe zone" 110. Where the measured distance is greater than the radius 123, the devices 104 and/or 106 determine the wearable device 106 and hence the subject is outside of the "safe zone" 110, as shown in FIG. 1.

In the latter instance, the base device 104 sounds an alarm such as a visual alarm 115 and/or an audible alarm 116, and the base device transmits the signal to the tower 112. The cellular tower 112 routes the signal, over the channel, to the server 117, which displays a notification via the monitor 118 in response thereto, which indicates the subject is outside of the "safe zone" 110. The server 117, with or without user interaction, transmits a signal to the portable device 122 over the channel 120, which sounds an alarm, which indicates the subject is outside of the "safe zone" 110.

In a variation, the system 100 can be used to monitor more than a single subject via multiple wearable devices 106, at least one with each subject.

In another variation, more than one base device 104 can be used to create a "safe zone" that is not circular, e.g., by using a combination of partially overlapping individual "safe zones," one for each different based device 104.

In another variation, the signal from the wearable device 106 can invoke the dispatch center 119 to send signals to more than one hand-held portable wireless device 122.

In another variation, signals from more than wearable device 106 can be sent to the same hand-held portable wireless device 122 and/or different hand-held portable wireless devices 122.

In another variation, one or more of the alarms 115 and 116 are omitted.

In another variation, the wearable device 106 is a badge, a clip, a belt, and/or other apparatus.

Figure 2:
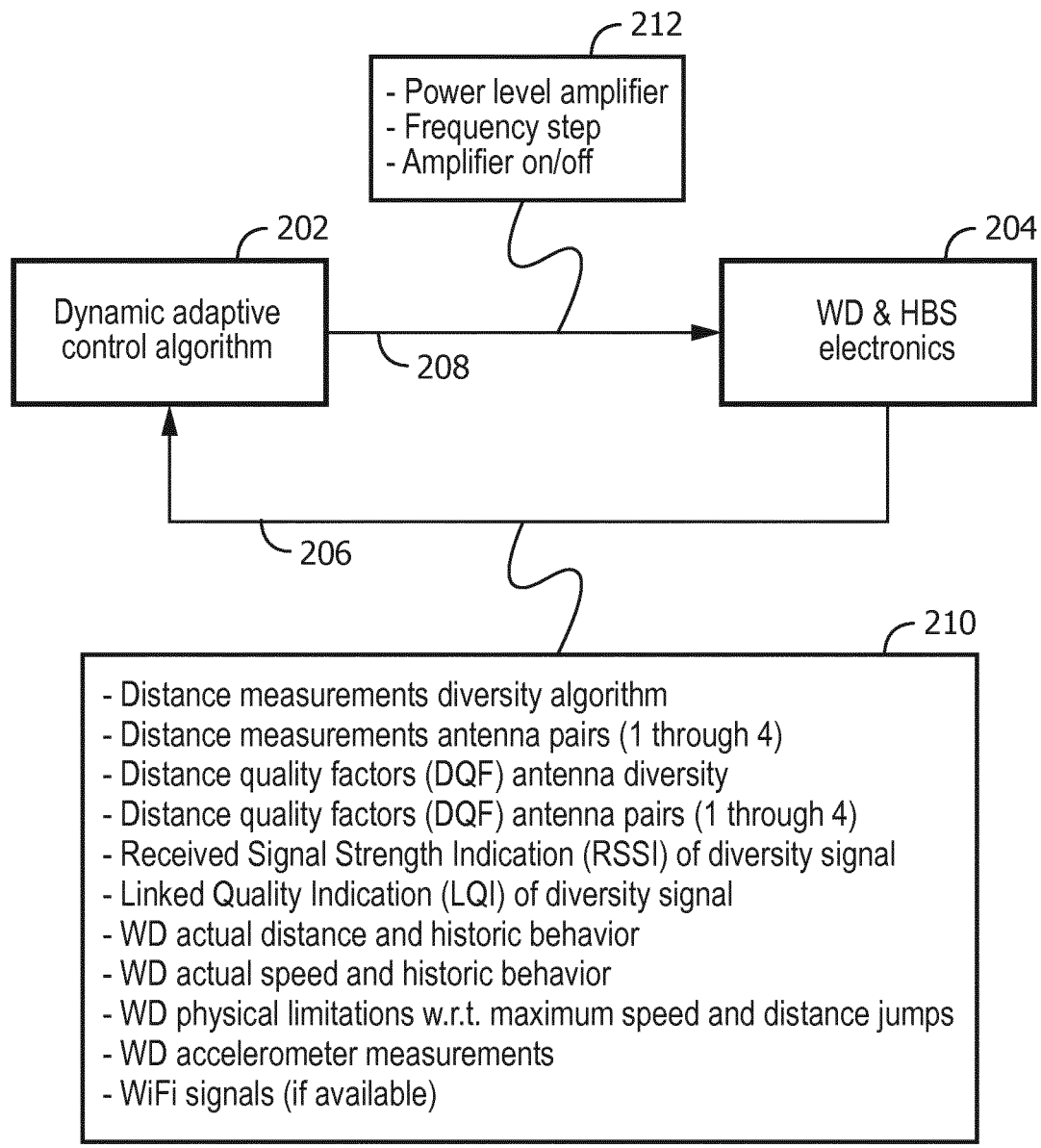
FIG. 2 depicts an adaptive automatic control algorithm to dynamically combine different distance signals.
Figure 3:
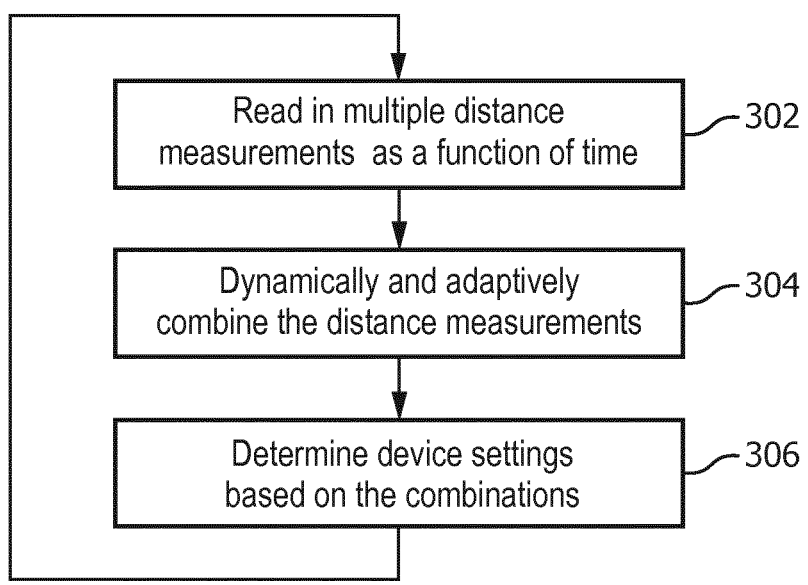
FIG. 3 illustrates example flow through the algorithm of FIG. 2.

FIG. 2 depicts a high level view of an adaptive automatic control algorithm 202 to dynamically combine the different distance measurement signals. FIG. 3 illustrates example flow using the algorithm of FIG. 2.

Initially referring to FIG. 2, the adaptive automatic control algorithm 202 and electronics 204 of the base device (or home base station, HBS) 104 and/or the wearable device (WD) 106 are configured for bi-directional communication via channels 206 and 208, as shown. The channel 208 and the channel 206 can be two independent and distinct channels or a same channel.

The electronics 204 provides distance information (e.g., distance information 210) over the channel 206 via a signal (s) to the adaptive automatic control algorithm 202, which processes this information. The adaptive automatic control algorithm 202, in response to processing the distance information, determines and conveys certain parameters (e.g., an operating parameter 212) to the base and/or wearable devices 104 and 106.

Example operating parameters and distance information includes a power level amplification, a frequency step, a control signal that turns power amplification on or off, a distance measurement determined from a diversity algorithm and/or for an antenna pair, a distance quality factor for the diversity and/or the pair, received signal strength of the diversity signal, linked quality indication of the diversity signal, Wi-Fi signals, a wearable device actual distance and a historic behavior, a wearable device actual speed and a historic behavior, a wearable device physical limitation with respect to speed and/or distance jumps, a wearable device accelerometer measurement, historical data of accelerometer, and/or combinations of distance/speed and accelerometer measurements.

Referring to FIG. 2 and FIG. 3, at 302, the adaptive automatic control algorithm 202 reads in multiple signals indicative of distance measurements from the electronics 204 of the base and/or wearable devices 104 and 106 as a function of time. In this example, the distance measurements are dependent on current power and frequency parameters of the base and/or wearable devices 104 and 106. In other instances, the distance measurements are dependent on other parameters.

At 304, the adaptive automatic control algorithm 202 dynamically and adaptively combines the distance measurements at different frequencies and power settings using historic data and physical limitations. At 306, the adaptive automatic control algorithm 202 determines device setting (e.g., power and frequency setting) for the base and/or wearable devices 104 and 106. The base and/or wearable devices 104 and 106 employ these settings and determine subsequent distance measurements.

As shown in FIG. 3, acts 302-306 can be repeated for dynamic and adaptive control one or more times.

Figure 4:
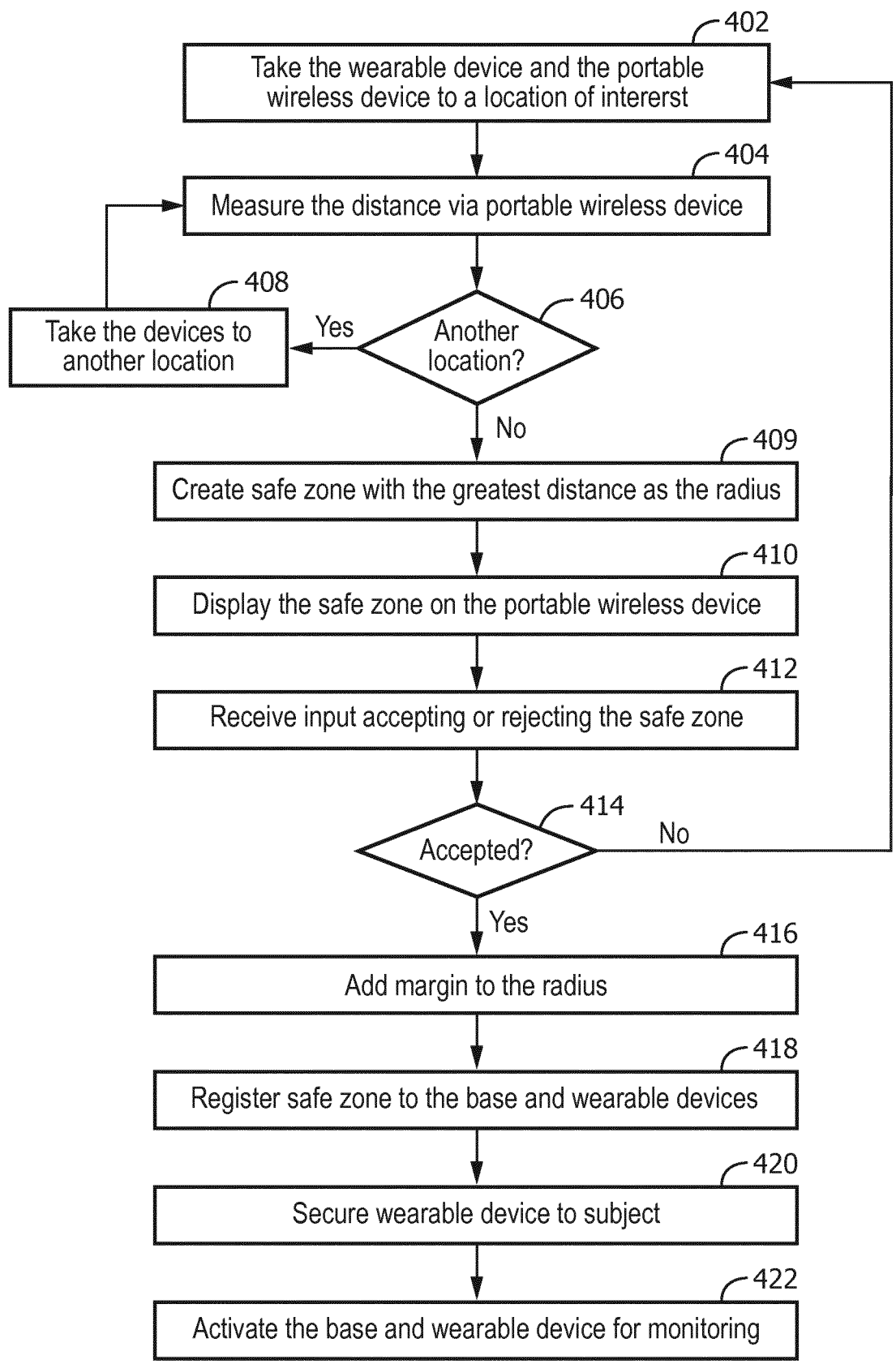
FIG. 4 illustrates an example method in accordance with an embodiment herein.

FIG. 4 illustrates an example method for establishing the "safe zone" 110.

In one instance, the following acts are performed to set up the base device 104, the wearable device 106 and the portable wireless device 122 before establishing the "safe zone" 110. The wearable device 106 is provided with enough portable power for the configuration process, if it does not already have enough portable power. This may include installing a primary or a secondary cell, or charging an installed secondary cell. The base device 104 is installed close to a center of a facility (e.g., the home of the subject). This location may facilitate achieving a safe zone that is equal distant around the facility. The base device 104 is powered by plugging its power cord into the electrical receptacle, a rechargeable battery, etc. A software application is installed on the portable wireless device 122. The software application at least includes a "safe zone" feature for configuring (e.g., creating, modifying, deleting, etc.) the "safe zone" 110.

It is to be appreciated that the ordering of the below acts is for explanatory purposes and not limiting. As such, other orderings are also contemplated herein. In addition, one or more of the acts may be omitted and/or one or more other acts may be included.

At 402, the wearable device 106 and the portable wireless device 122 are taken to a location of interest. The location corresponds to a point on the virtual fence 108 such as the radius 123 shown in FIG. 1. This location may be, e.g., next to a front door, a driveway, a mail box, etc.

At 404, the safe zone software running on the portable wireless device 122 measures the distance. For this, the software application on the smartphone 122 is first activated.

Then, the "safe zone" feature is started, which will start measurements to measure and calculate the radius 123 for the "safe zone" 110.

At 406, it is determined if another location is desired. If there is another location, at 408, the wearable device 106 and the portable wireless device 122 are taken to another location, and act 404 is repeated. The software can visually present the locations and/or distances as they are determined. Generally, measurements are taken along the perimeter, not across it. However, they can be taken across it if desired. For example, measurements can be taken on both sides of a door.

If there are no other locations, at 409 the software application determines a greatest distance from the distances determined at each location, and creates a safe zone using the greatest distance as the radius.

At 410, the safe zone is displayed on the portable wireless device 122.

At 412, an input accepting or rejecting the safe zone is received.

At 414, the safe zone is either accepted or rejected.

If the safe zone is rejected (not accepted), acts 402-414 are repeated.

If the safe zone is accepted, at 416, a margin (e.g., 1-3 meters) is added to the radius 123. The margin, in one instance, takes into account an accuracy of the system to create a safe margin to the boundary. This may ensure false alarms are not triggered.

At 418, the "safe zone" 110 with the margin is registered to the base device 104 and the wearable device 106, e.g., through a cellular link via an internet service provider, a Wi-Fi link between the portable wireless device 122 and the base and wearable devices 104 and 106, a Bluetooth link between the portable wireless device 122 and the base and wearable device 104 and 106, a hardwire (e.g., a cable) connection between the portable wireless device 122 and the base and wearable device 104 and 106, etc.

At 420, the wearable device 106 is secured to the subject.

At 422, the base device 104 and the wearable device 106 are activated for monitoring the location of the subject.

The method herein may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried by a signal, carrier wave or other transitory medium.

Non-limiting example dynamic and adaptive algorithms based on averages of data are described next.

Average distance antenna $pair1$ ($ADAP1$) =
$$\left(\frac{1}{N}\right)(Distance1p1 + Distance2p1 + \ldots + DistanceNp1).$$

Average distance antenna $pair2$ ($ADAP2$) =
$$\left(\frac{1}{N}\right)(Distance1p2 + Distance2p2 + \ldots + DistanceNp2).$$

Average distance antenna $pairx$ ($ADAPX$) =
$$\left(\frac{1}{N}\right)(Distance1px + Distance2px + \ldots + DistanceNpx).$$

$$\text{Average distance} = \left(\frac{1}{N}\right)(ADAP1 + ADAP2 + \ldots + ADAPX).$$

In the above, the average distance antenna pair is an average of N individual distance measurements for an antenna of the base device 104 and an antenna of the wearable device 106.

Average RSSI antenna $pair1$ $(ARSSIAP1) =$ $$\left(\frac{1}{N}\right)(RSSI1p1 + RSSI2p1 + \ldots + RSSINp1).$$

Average RSSI antenna $pair2$ $(ARSSIAP2) =$ $$\left(\frac{1}{N}\right)(RSSI1p2 + RSSI2p2 + \ldots + RSSINp2).$$

Average RSSI antenna $pairx$ $(ARSSIAPX) =$ $$\left(\frac{1}{N}\right)(RSSI1px + RSSI2px + \ldots + RSSINpx).$$

Average $RSSI = \left(\frac{1}{N}\right)(ARSSIAP1 + ARSSIAP2 + \ldots + ARSSIAPX).$ In the above, the average RSSI antenna pair is an average of N individual RSSI measurements for an antenna of the base device 104 and an antenna of the wearable device 106.

Average distance quality antenna $pair1$ $(ADQAP1) =$ $$\left(\frac{1}{N}\right)(\text{Distance } Quality1p1 +$$
$$\text{Distance } Quality2p1 + \ldots + \text{Distance } QualityNp1).$$

Average distance quality antenna $pair2$ $(ADQAP2) =$ $$\left(\frac{1}{N}\right)(\text{Distance } Quality1p2 + \text{Distance } Quality2p2 +$$
$$\ldots + \text{Distance } QualityNp2).$$

Average distance quality antenna $pairx$ $(ADQAPX) =$ $$\left(\frac{1}{N}\right)(\text{Distance } Quality1px + \text{Distance } Quality2px +$$
$$\ldots + \text{Distance } QualityNpx).$$

Average distance quality $= \left(\frac{1}{N}\right)$
$$(ADQAP1 + ADQAP2 + \ldots + ADQAPX).$$

In the above, the distance quality antenna pair is an average of N individual distance quality measurements for an antenna of the base device 104 and an antenna of the wearable device 106.

Other information such as a quality indicator, a signal quality, etc. can also be averaged.

A non-limiting example dynamic and adaptive algorithm based on a standard deviation on distance and quality measurements can be calculated according to:

$$Sx = \sqrt{\sum_{i=1}^{n} \frac{(x_i - \bar{x})^2}{n-1}},$$

where n=The number of data points, $\bar{x}$=The mean of the $x_i$, and $x_i$=Each of the values of the data.

Speed can be determined by distance over time and by including, for example, motions sensor information. Combining this with human physical limits can be used by the algorithm to optimize the calculations, where individual measurements that are outside the limits can be, for example, discarded or used with less weight. In the geo fencing measurement, this speed could also give information about the person going towards the boundary such as walking towards it. Maximum walking speed of, for example, one meter per second (1 m/s) can be taken into account in determining the quality of the consecutive distance measurements, physical reality.

Other signal combinations can be combined with information gathered during testing and analysis in known environments. For example, if the signal strength of the measurements is high with normal deviation, the quality indicator measurements are low and the deviation on the distance is high it could be determined to be a high reflective room. Increasing the power may not be the best solution. Decreasing and weighing the shorter distance measurements higher in the calculations may provide a better result. In another example, when the quality signals are high, the RSSI is high, deviation is high including some very large outliers, it could be determined an open field situation. Increasing the power to get the direct straight line could be more beneficial.

The information gathered during testing and analyzing could, for example, be implemented using a look-up table approach, specific combinations of measurement results and system info point to a specific place into the lookup table where a classification is given of the estimated environment and optimal settings, and weighing factors used to calculate the resulting distance and optimal settings. An example of a lookup table example is shown in Table 1.

TABLE 1

An example lookup table.

| Distance | RSSI | Quality | SD | Power Level used | New Power Level | Weighing factor |
|---|---|---|---|---|---|---|
| 1 | 1 | 1 | 1 | 1 | 2 | 7 |
| 2 | 1 | 1 | 1 | 1 | 2 | 6 |
| 3 | 1 | 1 | 1 | 1 | 2 | 5 |
| 1 | 2 | 1 | 1 | 1 | 2 | 6 |
| 2 | 2 | 1 | 1 | 1 | 2 | 6 |
| 3 | 2 | 1 | 1 | 1 | 2 | 3 |
| 1 | 3 | 2 | 1 | 1 | 1 | 2 |
| 2 | 3 | 2 | 1 | 1 | 1 | 8 |
| 3 | 3 | 2 | 1 | 1 | 1 | 4 |
| 1 | 1 | 2 | 1 | 1 | 1 | 5 |
| 2 | 1 | 2 | 1 | 1 | 1 | 2 |
| 3 | 1 | 2 | 1 | 1 | 1 | 2 |
| 1 | 2 | 3 | 2 | 1 | 1 | 2 |
| 2 | 2 | 3 | 2 | 1 | 1 | 6 |
| 3 | 2 | 3 | 2 | 1 | 1 | 6 |
| 1 | 3 | 3 | 2 | 1 | 1 | 7 |
| 2 | 3 | 3 | 2 | 1 | 1 | 7 |
| 3 | 3 | 3 | 2 | 1 | 1 | 8 |
| 1 | 1 | 1 | 2 | 1 | 2 | 8 |
| 2 | 1 | 1 | 2 | 1 | 2 | 8 |
| 3 | 1 | 1 | 2 | 1 | 2 | 9 |
| 1 | 2 | 1 | 2 | 1 | 1 | 9 |
| 2 | 2 | 1 | 2 | 1 | 1 | 5 |
| 3 | 2 | 1 | 2 | 1 | 1 | 5 |
| 1 | 3 | 2 | 3 | 2 | 2 | 3 |
| 2 | 3 | 2 | 3 | 2 | 2 | 8 |
| 3 | 3 | 2 | 3 | 2 | 2 | 8 |
| 1 | 1 | 2 | 3 | 2 | 2 | 7 |
| 2 | 1 | 2 | 3 | 2 | 2 | 7 |
| 3 | 1 | 2 | 3 | 2 | 2 | 7 |
| … | … | … | … | … | … | … |

An example of a calculation of optimal settings and distance using Table 1 is provided next. For this example, the measured inputs are: Distance=2, RSSI=1, Quality=1, SD=1, Power level=1. An example algorithm could be "[New power level, weighing factor]=find(Lookup table, 2,1,1,1,1)," where if the new power level is not equal to the old power level, the power level is set to the new power level, and another set of measurements are determined under the new operating conditions. The new distance can be calculated using an average including a weighing factor.

Dynamic behavior can be partly done by the above example and adding information sources and controls. On the other hand, the dynamics over time could also include the adoption of measurement sampling speed. If not moving, the sampling speed can be very low. If far from the boundary and in combination with the physical limit of 1 m/s, the sampling speed can also be reduced. Accuracy can also be treated in a similar way. If not needed, the accuracy can be lowered. If an alarming situation is detected, the system could increase the sampling speed and the accuracy related information sources and calculations. Including information from the environment estimate could also give the option to adopt the system accordingly. For example, in a clean environment the accuracy could be high without extra steps taken. In the opposite situation, it could be determined that extra measurements are needed to get to the desired confidence level.

Dynamic control can also be done by scanning the different parameters almost continuously and read out results, and, based on this information employ an adaptive algorithm for the parameter settings to determine the actual distance, which also can include historical data. In this way, the optimal setting is chosen based on scanning results and optionally historical data. This adaptive control is ongoing, thus continuously scanning for optimal performance at lowest cost of energy.

The following provides a non-limiting example. Given the following: distance to geo fence boundary is 5 meters; environment is clean with a direct line of site connection; sensors and history information determine the user is walking; a maximum speed of elderly person is 0.8 m/s, and an accuracy of distance measurement is determined to be 2 meters. With one non-limiting algorithm and these inputs, if a distance to the boundary is greater than two times the accuracy, or if a difference between the distance to boundary and the accuracy is greater than a minimum reaction time multiplied by the maximum speed and the environment is clean, then the sampling speed is set to X, the accuracy is set to Y, and the distance is set to Z.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A geo-fencing system, comprising:
   a base device configured to create a virtual fence around the base device that bounds a safe zone;
   a wearable device initially located within the safe zone;
   a processor configured to execute a control algorithm that computes, at a given frequency, at least one operating parameter for at least one of the base device and the wearable device based on a combination of received different signals indicative respectively of different types of distance measurements between the wearable device and the base device computed by the processor of at least one of the base device and the wearable device, wherein the at least one operating parameter includes at least a next power level for the at least one of the base device and the wearable device, and the processor conveys the at least one operating parameter to the at least one of the base device and the wearable device, which employs the at least one operating parameter for operation and determination of subsequent distance measurements; and
   a memory configured to store a look-up table that maps each set of a plurality of pre-determined sets of different combinations of values of the different signals indicative respectively of different types of distance measurements and a current power level operating parameter to a respective operating power, wherein the processor is configured to compute the next operating power by selecting the operating power in the set of pre-determined sets that includes the values of the received different signals indicative respectively of different types of distance measurements and the current power level operating parameter.

2. The geo-fencing system of claim 1, wherein the processor computes the combination based on one of a fixed combination of the signals, an invariant and dynamic combination of the signals, and a dynamic combination of the signals in time.

3. The geo-fencing system of claim 1, wherein the combination is dependent on at least one of a surrounding environment, a position of the wearable device within the geo-fence, a movement of the wearable device, and a location of another object within the geo-fence.

4. The geo-fencing system of claim 1, wherein the at least one operating parameter further includes a frequency level signal.

5. The geo-fencing system of claim 1, wherein at least one of the base device and the wearable device determines the combination of different signals based on one or more of a received signal strength indicator signal, a time of flight signal, a sine phase signal, a Wi-Fi signal, global positioning signal, a quality indicator signal, a wearable device position signal, or a wearable device speed signal.

6. The geo-fencing system of claim 1, the processor is configured to combine the signals using a historic distance, an operating parameter data, and one or more physical limitations of the system.

7. The geo-fencing system of claim 1 wherein the virtual fence is a circular fence with a radius.

8. The geo-fencing system of claim 1, wherein the processor is a processor of the base device.

9. The geo-fencing system of claim 1, wherein the processor is a processor of the wearable device.

10. The geo-fencing system of claim 1, wherein the base device is located at a center region of a safe zone, and at least one of the base device or the wearable device transmits an alarm in response to the wearable device moving outside of the safe zone.

11. A method, comprising:
    reading in multiple different signals indicative respectively of different types of distance measurements between a wearable device and a base device from electronics of at least one of the base device and the wearable device, wherein the base device is configured to create a virtual fence around the base device that bounds a safe zone, and the wearable device is initially located within the safe zone; and
    computing, at a given frequency, at least one operating parameter that includes at least a next power level for at least one of the base device and the wearable device based on a combination of the read different signals by selecting an operating power mapped to a set of a plurality of pre-determined sets that includes values of the received different signals and a current power level operating parameter, wherein each set of the plurality of pre-determined sets maps a different combination of values of the different signals indicative respectively of different types of distance measurements and power levels to a respective operating power, wherein the at least one of the base device and the wearable device employs the at least one operating parameter for operation and determination of subsequent distance measurements.

12. The method of claim 11, further comprising: configuring a geo-fence safe zone with a software application on a smartphone prior to the acts of reading and computing.

* * * * *